United States Patent [19]

Sakurai

[11] 3,889,238

[45] June 10, 1975

[54] CONTROL DEVICE FOR MULTI-AXIS SERVO-ACTUATORS

[75] Inventor: Itaru Sakurai, Nagoya, Japan

[73] Assignee: Toyoda-Koki Kabushiki Kaisha, Aichi-ken, Japan

[22] Filed: Feb. 27, 1974

[21] Appl. No.: 446,409

[30] Foreign Application Priority Data

Feb. 28, 1973 Japan .................... 48-24597

[52] U.S. Cl. ......... 340/172.5; 235/151.11; 214/1 B; 318/569
[51] Int. Cl. .......................... G06f 15/46; B25j 9/00
[58] Field of Search ............... 235/151.11, 151; 340/172.5

[56] References Cited
UNITED STATES PATENTS
3,654,613  4/1972  Dunne et al. ............... 235/151.11

Primary Examiner—Eugene G. Botz
Attorney, Agent, or Firm—Oblon, Fisher, Spivak, McClelland & Maier

[57] ABSTRACT

A control device for multi-axis servo-actuators serves to control a position and a posture of a controlled object, which has a plurality of degrees of freedom in a three-dimensional space, in accordance with a time sharing control. In this control device, only the switching signals or the on-off signals are given to the servo-amplifier for controlling the output thereof, whereby the scanning or controlling speed can be greatly increased.

8 Claims, 8 Drawing Figures

CONTROL DEVICE FOR MULTI-AXIS SERVO-ACTUATORS

BACKGROUND OF THE INVENTION

1. Field of the Invention

The present invention relates generally to a control device for a controlled object having a plurality of actuation axes, and more particularly to a time sharing control device for multi-axis servo-actuators in which each actuation of, for example, an industrial robot having a plurality of degrees of freedom is controlled in response to a command value of an actuation for each axis which is switched by a scanning signal for each axis.

2. Description of the Prior Art

In general, it is known that the servo-actuators for each axis of, for example, an industrial robot having a plurality of actuation axes are simultaneously controlled in accordance with a time sharing control method. This sort of prior art control system is of the analogue servo type in which the servo-amplifiers which control the servo-valves are respectively supplied with control signals proportional to the differencials between the command values and the present values for each actuation axis. Accordingly, such prior art devices, while somewhat satisfactory, needed at least a Digital-analogue (D-A) converter for converting an output of a comparator which served to sequentially generate each differencial value between each command and present values for each actuation axis and furthermore, a plurality of memory circuits for memorizing and holding each level of the above noted analogue control signal out of the D-A converter for applying the same to each servo-valve while the control operation was being switched into for the other axis. Thus, one problem unavoidable in the prior art technology was that a complex control circuit structure was needed and the same resulted in high cost.

Furthermore, in the prior art devices it was necessary for memorizing the control signals in analogue form such that the switching period for sequencially switching the command and present values for each operation axis was relatively long. Thus, the response of the servo-system could not be improved because the frequency of the scanning signal could not be made higher.

SUMMARY OF THE INVENTION

Accordingly, it is an object of the present invention to provide a new and improved unique control device for multi-axis servo-actuators which has a much simplified circuit structure compared with heretofore existing devices.

Another object of the present invention is the provision of a new and improved control device for multi-axis servo-actuators which has a greatly improved response.

The foregoing and other objects are obtained in accordance with one aspect of the present invention through the provision of a control device for multi-axis servo-actuators which serve to control a position and a posture of a controlled object having a plurality of degrees of freedom in a three-dimensional space which includes a command value register means for setting a plurality of command values for respective axes and a present position detecting means for detecting the present position of each of the servo-actuators and for generating present values for the respective axes in response to the present positions. A first selector is connected to the command value register and serves to sequentially select and output one of the command values in accordance with scanning signals. A second selector is connected to the present position detecting means and serves to sequentially select and output one of the present values in accordance with the scanning signals. A scanning signal generating means for generating the scanning signals is provided and a first comparator is connected to the first and second selectors and serves to sequentially compare said present value with the command value for each axis and for generating a first control signal and a second control signal. The first control signal represents an inequality between the command value and the present value, and the second signal indicates a coincidence between the command value and the present value. A second comparator is provided and serves to generate a third signal when the difference between the command value and the present value becomes smaller than a setting value. A first register means serves to generate an actuation and direction indication signal for each axis in response to the first and third signals supplied from the first and second comparators in accordance with the scanning signals out of the scanning signal generating means. A second register means serves to memorize the coincidence signal for each axis in response to the second signal supplied from the first comparator in accordance with the scanning signals supplied thereto and to generate an actuation stop signal for each axis based upon the coincidence signal, the actuation and direction indicating signal and the actuation stop signal being switching or on-off signals. A plurality of servo-amplifiers were provided for the respective axes and are connected to said first and second register means so as to be supplied with the actuation and direction signal and the actuation stop signal, and for respectively generating a predetermined output in response to the actuation and direction signal and the actuation stop signal; and, a plurality of servo-valves are connected to the servo-amplifiers and serve to control the actuations of the servo-actuators in accordance with the predetermined output out of the servo-amplifier for each axis.

BRIEF DESCRIPTION OF THE DRAWINGS

Various other objects, features and attendant advantages of the present invention will be more fully appreciated as the same becomes better understood from the following detailed description of a preferred embodiment of the present invention when considered in connection with the accompanying drawings in which.

DETAILED DESCRIPTION OF A PREFERRED EMBODIMENT

Figure 1:
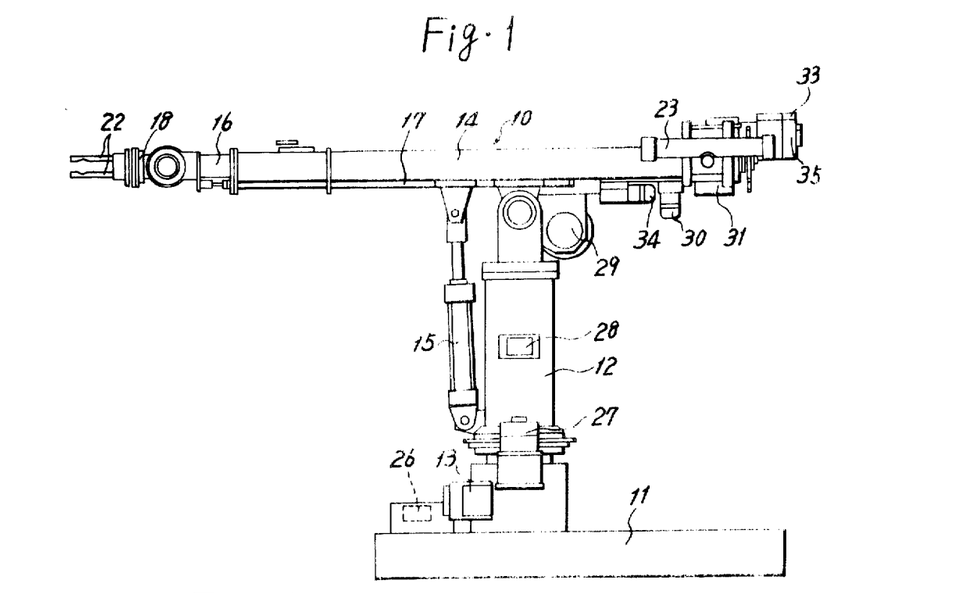
FIG. 1 is a front elevation view of an industrial robot.
Figure 2:
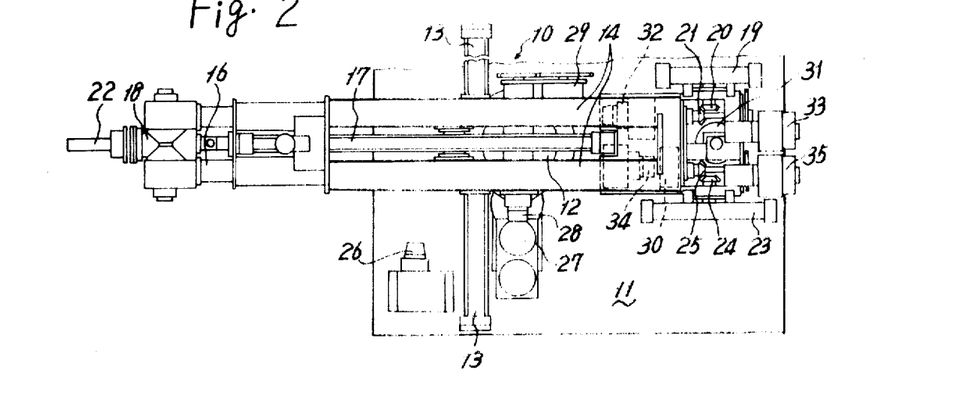
FIG. 2 shows a plane view of the industrial robot shown in FIG. 1.

Referring now to the drawings, wherein like reference numerals and characters designate identical or corresponding parts throughout the several views, and more particularly to FIGS. 1 and 2 thereof, wherein an industrial robot 10 is shown as a suitable example of a controlled object. The industrial robot 10 has five degrees of freedom and the operational axes corresponding to the respective five degrees of freedom are, for convenience, designated as the R-axis, U-axis, E-axis, B-axis and S-axis. The R-axis movement refers to a swivel movement of a swivel trunk 12 around an axis rectangular to an upper surface of a base 11 and the swivel trunk is acuated by a hydraulic cylinder 13 mounted on the base 11 through a rack and a pinion mechanism. The U-axis movement is an upwardly and downwardly rotational movement of an arm support 14 pivoted on the upper end of the swivel trunk 12, and is performed by a cylinder 15 provided between the swivel trunk 12 and the arm support 14. The E-axis movement is a reciprocal movement of an arm member 16 slidably mounted on the arm support 14 and is performed by a cylinder 17 mounted on the arm support 14 in parallel to the arm member 16. The B-axis movement refers to a rotary bending movement of a finger support 18 and is carried out by the S-axis of the cylinder 19 through bevel gears 20, 21 rotated through a rack and pinion mechanism connected with the cylinder 19, and through a spline shaft provided in the other end of the arm member 16 and connected thereto. The S-axis movement is a rotary or spin movement of the fingers 22 rotatably mounted on the finger support 18 and is caused by the actuation of a cylinder 23, which is provided at the rear portion of the arm support 14, through bevel gears 24, 25 rotated through a rack and pinion mechanism connected with the cylinder 23, and through a spline shaft provided in the other end of the arm member 16 and connected thereto. Pressurized fluid is supplied from a servo-valve 26 to the cylinder 13 for the R-axis move ment, and the present position of the swivel trunk 12 is detected by a encoder 27 which is rotationally actuated in response to the rotation of the swivel trunk 12 through a gear mounted on the trunk coaxially thereto and meshingly engaged with the encoder. The cylinder 15 for the U-axis movement is supplied with pressurized fluid from a servo-valve 28 for actuating the same and the present position of the arm support 14 is detected by an encoder 29.

Pressurized fluid is supplied from a servo-valve 30 into the cylinder 17 for the E-axis movement. The present position of the arm member 16 is detected by an encoder 31 which is rotated in response to the reciprocal movement of the arm member 16 through a wire rope serving to connect therebetween. Pressurized fluid is supplied from a servo-valve 32 into the cylinder 19 for the B-axis movement and is further supplied from a servo-valve 34 into the cylinder 23 for the S-axis movement. The present positions as to the B-and S-axis movements are respectively detected by the encoders 33 and 35.

Figure 3:
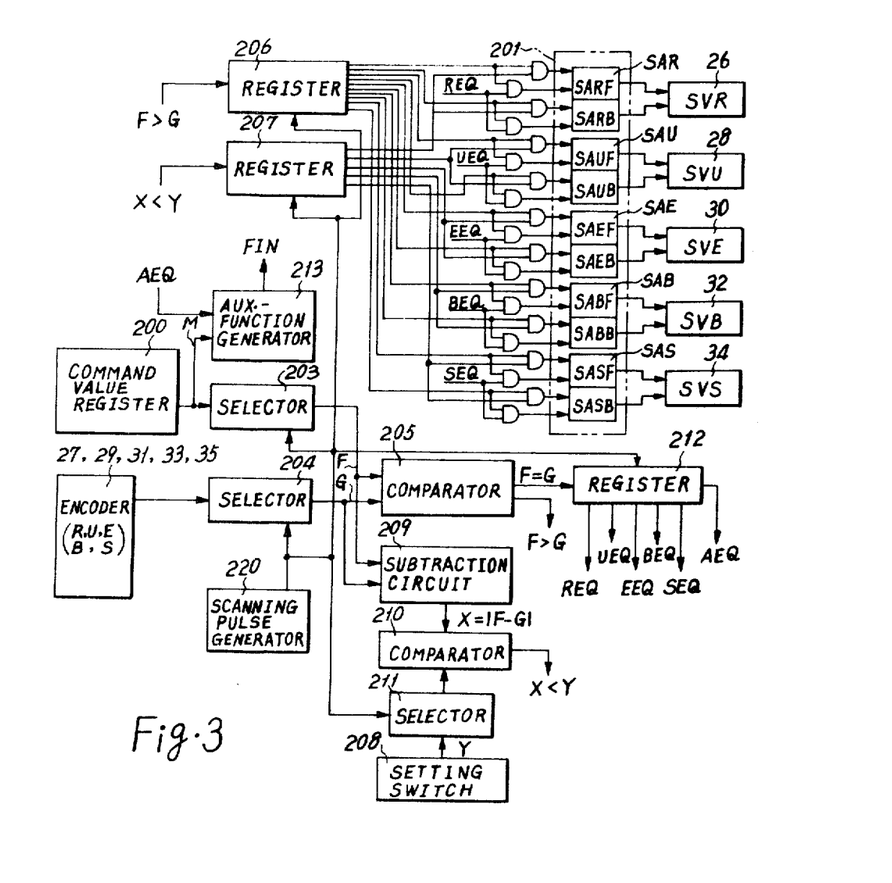
FIG. 3 is a block diagram of a control system in accordance with the present invention.

FIG. 3 shows a block diagram of a controller for controlling the above-described robot of FIGS. 1 and 2.

Figure 4:
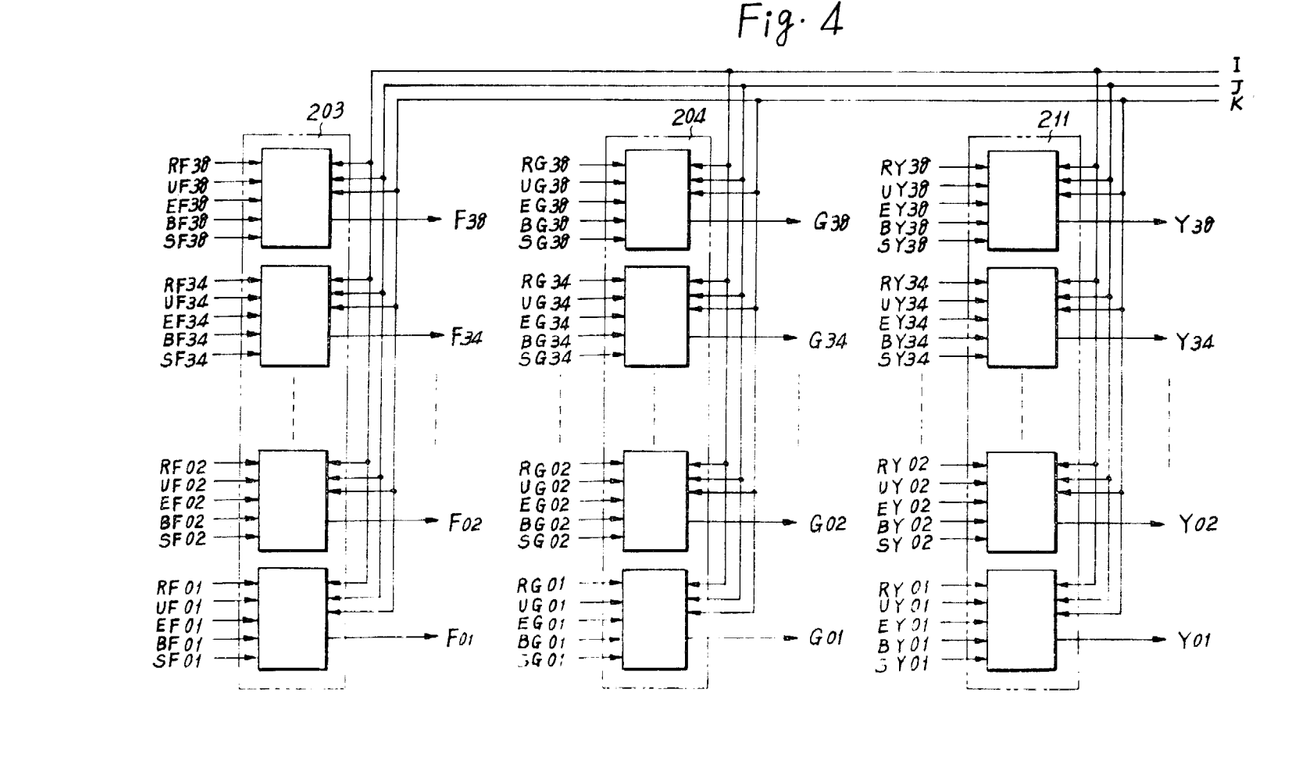
FIG. 4 shows an embodiment of selectors for use with the present invention.
Figure 5:
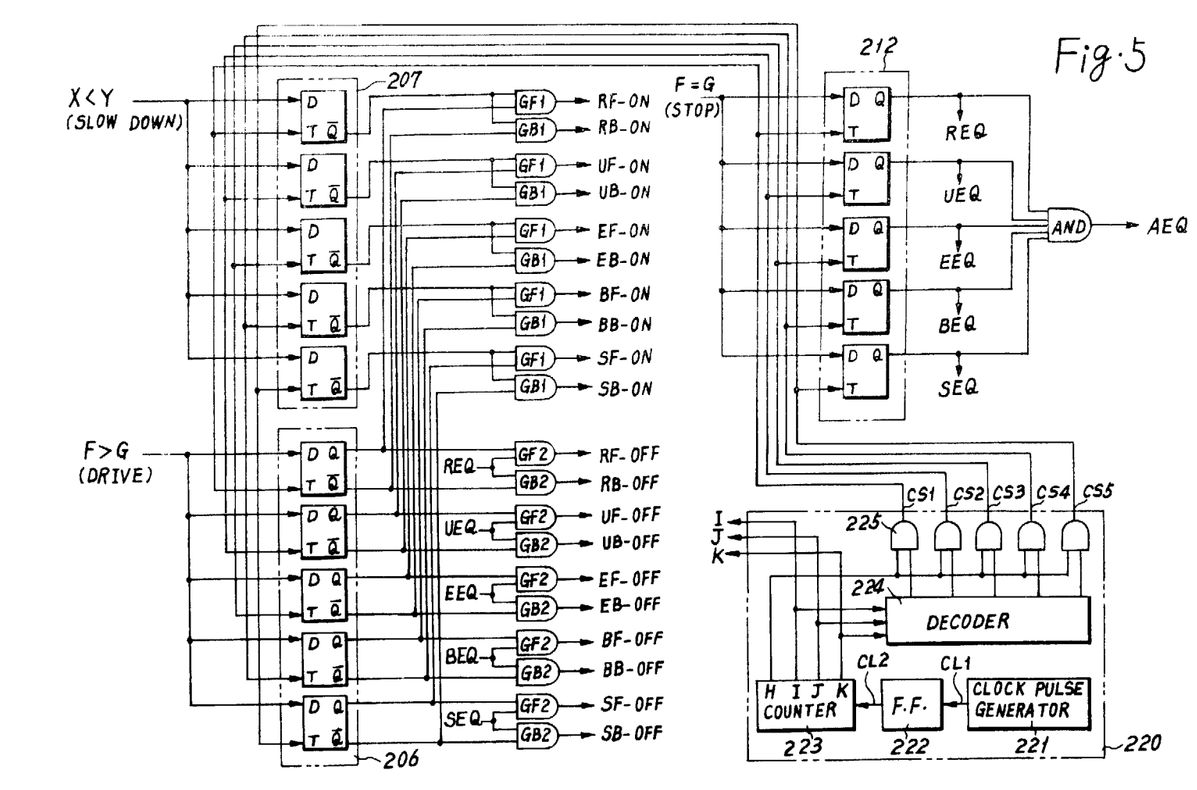
FIG. 5 shows registers and a scanning pulse generator for generating timing pulses as scanning signals for use with the present invention.

The command values which provide the point informations for the respective axes are conventionally memorized in a magnetic memory, and are read out therefrom and preset into a command value register 200. The servo-valves 26, 28, 30, 32 and 34 serve to control the supply of the pressurized fluid so as to position the fingers 22 at an objective point designated by the command values in response to the outputs of servo-amplifiers based upon ON-OFF signals meaning DRIVE, SLOW DOWN, STOP etc. which are obtained by a comparision between respective ones of the command values preset in the command value register 200 and the present values detected by the encoders 27, 29, 31, 33 and 35. The respective command values for the R-, U-, E-, B- and S-axis movements are preset in the command value register 200 and are, in turn, selected by a selector 203 which serves to sequentially and selectively switch and output the command values for the R-, U-, E-, B- and S-axis movements synchronously with the clock pulses as selecting or scanning signals generated from a scanning ppulse generator 220. The details of the above will be described in detail later. Moreover, the present values detected by the encoders 27, 29, 31, 33 and 35 are also sequentially and selectively switched by a selector 204 synchronously with the above noted clock pulses. These selectors 203 and 204 and a later described selector 211 are, as shown in FIGS. 4 and 5, able to output respective ones of the axis data toward output terminals F01 to F38, G01 to G38 and Y01 to Y38 in response to the status of the binary selecting signals I, J and K which are generated from a counter 223 in the scanning pulse generator 220. It is to be noted that the terminals F01 and F38 or G01 to G38 or Y01 to Y38 respectively show the binary bits of the value. The selected command and present-values F, G for each axis are supplied to a comparator 205 and, at the same time, to a subtraction circuit 209. When the command value F is larger than the present value G, that is, F > G in consequence of the comparision by the comparator 205, the register 206 can be set for instructing an advancing movement or a forward movement. When the command value F is smaller than the present value G, that is, F < G, the register 206 can be reset, whereby a retraction movement or a backward movement is instructed. The register 206 comprises flip-flop circuits for the respective axes R, U, E, B and S which can be set only in the case where F > G. It is to be noted that the flip-flop circuits of the register 206 and of later described registers 207, 212 are all well known D-type flip-flop circuits. In these circuits, when the input at the D input terminal is high or the logical value "1"and then a trigger pulse is applied to the trigger terminal T the output of the set output terminal Q can be or is turned into the logical value 1, that is, the flip-flop circuits are set. In this status, the output of the reset output terminal $\overline{Q}$ is, of course, low or a logical value "O". On the contrary, when the input at the D input terminal is "O" and then the trigger pulse is applied to the trigger terminal T, the output of the reset output terminal $\overline{Q}$ is turned into 1, that is, the flip-flop circuit is reset. The set output terminals Q of the flip-flop circuits in the register 206 are respectively connected to the activation start input terminals RF-ON, UF-ON, —SF-ON of the servo-amplifiers SARF, SAUF, SAEF, SABF and SASF, for effecting advancing movement through the AND gates GF1, and furthermore to the actuation stop input terminals RF- OFF, UF-OFF,—,SF-OFF of the above-noted servo-amplifiers through the AND gates GF2. The reset output terminals $\overline{Q}$ of the flip-flop circuits are respectively connected to the actuation start input terminals RB-ON, UB-ON,—,SB-ON of the servo-amplifiers SARB, SAUB, SAEB, SABB and SASB for effecting a retraction movement through the AND gates GB1 and furthermore to the actuation stop input terminals RB-OFF, UB-OFF,—, SB-OFF of the servo-amplifiers SARB to SASB through the AND gates GB2.

The register 207 comprises five flip-flop circuits which can be respectively set when the later described slow-down signal: X<Y is generated. The reset output terminals of the flip-flop circuits in the register 207 are respectively connected with the other input terminals of the AND gates GB1 and GB2. The slow down signal: X<Y which can be set in the register 207 is generated from the comparator 210 when the difference X between the command value F and the present value G calculated by the subtraction circuit 209 becomes smaller than a predetermined setting value Y supplied from the setting switch 208. That is, the flip-flop circuits of the register 207 can be set when the value X becomes smaller than the value Y. Then, the AND gates GF1, GB 1 are disabled as the other input terminals of the AND gates are respectively connected to the reset output terminals of the flip-flop circuits of the register 207. The register 212 comprises flip-flop circuits which can be set in response to the coincidence signal: F=G supplied from the comparator 205, which coincidence signal is generated when the command value F coincides to the present value G. The other input terminals of the AND gates GF2, GB 2 are respectively connected to the set output terminals of the flip-flop circuits in the register 212.

The scanning pulse generator 220 comprises a clock pulse generator 221, a flip-flop circuit 222 of the well known S-R type for providing a pulse form correction, a counter 223, a decoder 224, and AND gates 225, as shown in FIG. 5.

Figure 7:
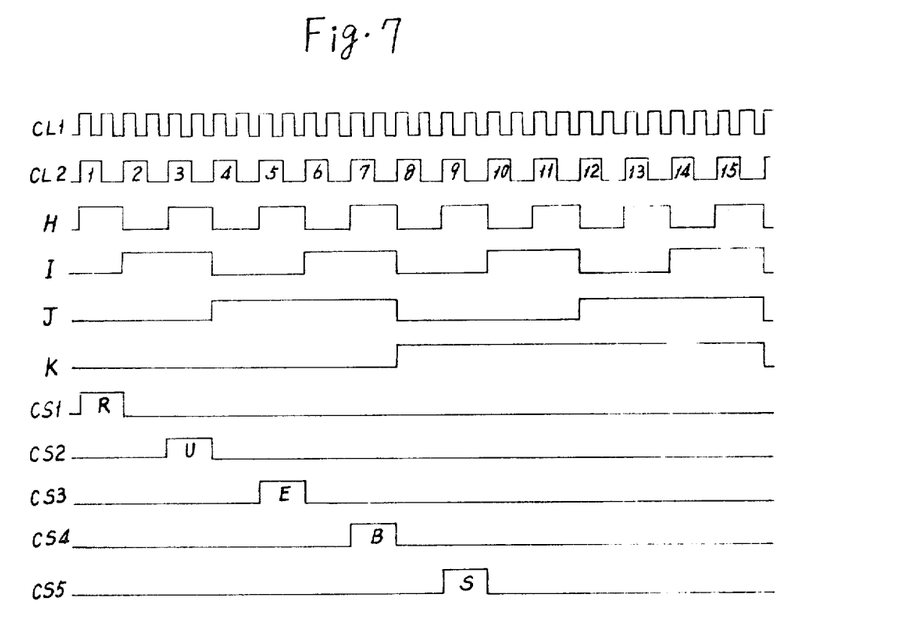
FIG. 7 shows a timing chart for the scanning pulse generator.

The counter 223 is a binary counter of 4 bits and counts up the clock pulses CL2 supplied from the flip-flop circuit 222 which divides the pulses from the generator 221 and corrects the form of the pulses. The output terminals H, I, J and K of the counter 223 correspond to respective bits and the terminal H is the lowest or least significant figure and the terminal K is the highest or most significant figure. The output signal of the counter 223 is shown in FIG. 7. The binary code signals generated from the output terminals I, J and K which are 3 bits of higher figures are supplied to the select signal input terminals of the selectors 203, 204, 211 and serve to sequentially select appropriate data for R-, U-, E-, B- and S-axis movements in that order. Furthermore, the binary coded signals from the counter 223 are applied to the decoder 224, and the AND gates 225. An input terminal of the AND gates 225 is connected to the output terminals of the decoder 224. The AND gates 225 generate the pulse signals CS1, CS2, CS3, CS4, CS5 each of which have different phases to each other by one period of the pulse signal generated from the output terminal H of the counter 223, synchronously with the signal out of the terminal H. The signals CS1, CS2, CS3, CS4, CS5 are respectively applied to the trigger terminals T of the flip-flop circuits of the registers 206, 207, 212 in that order as shown in FIG. 5. The signals representing F>G, X<Y, F=G are respectively applied to all of the input terminals D of the flip-flop circuits of the respective register 206, 207, 212. Thus, when the data for R-axis movement are selected by the selectors 203, 204, 211, the flip-flop circuit used for the R-axis in the register 206 or 207 or 211 may respectively memorize the signal F>G or X<Y or F=G. In this way, pulse signals of extremely high frequencies, such as the scanning signals, are applied to the selectors and the registers for selection of the data on the R-, U-, E-, B-, and S-axis movements and for memorization of the signals out of the comparator in the registers. In case the frequency of the clock pulse out of the generator 221 is, for example, 3 M Hz (Mega-Hertz), it takes 10 μs. (micro second) in one scanning operation and thus it is clearly possible to perform the scanning operation at extremely high speed.

Figure 6:
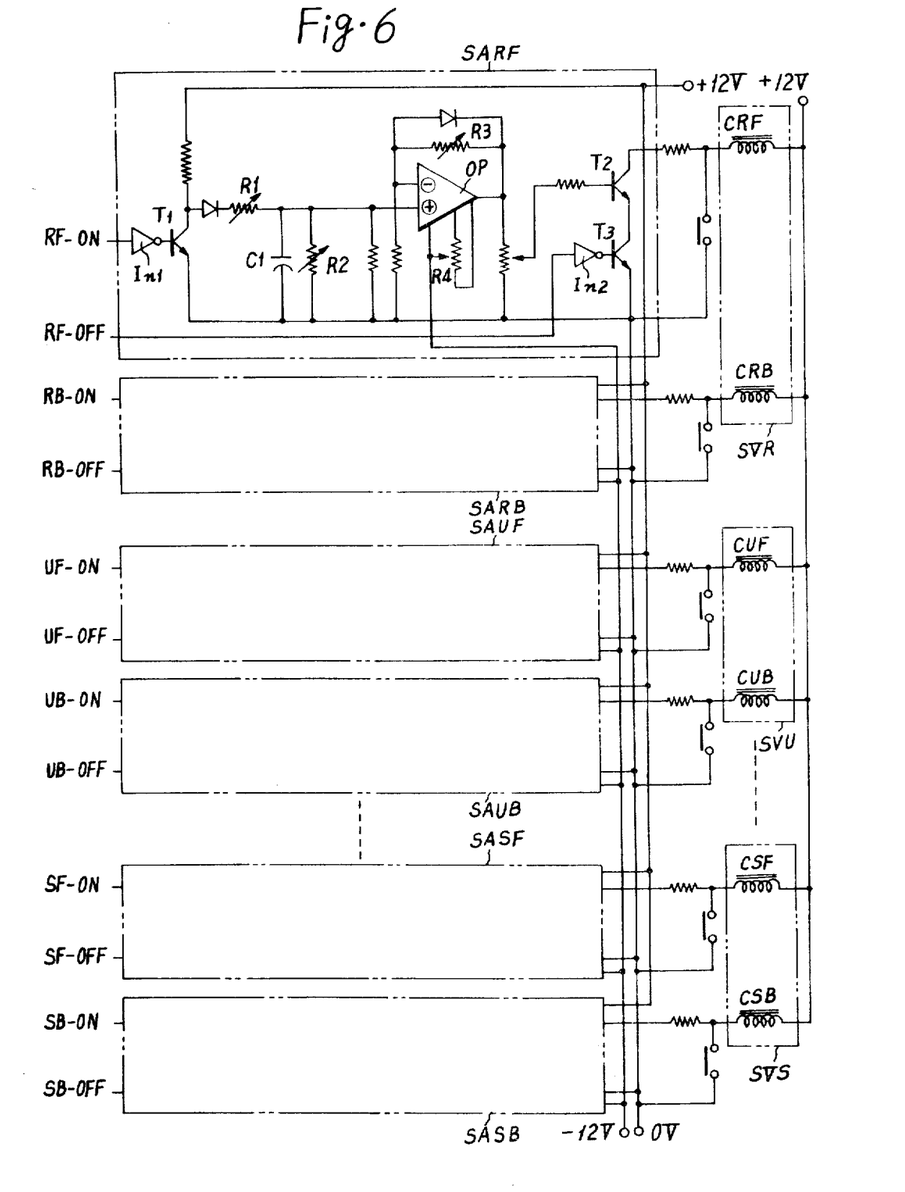
FIG. 6 is a detailed circuit of the servo-amplifier of the present invention.

The ON or OFF signals are supplied to the actuation start input terminals RF-ON, RB-ON,—, SF-ON and SB-ON, and the actuation stop input terminals RF-OFF; RB-OFF,—SF-OFF and SB-OFF of the servo-amplifiers SARF, SARB, —, SASF and SASB in response to the set or reset of the registers 206, 207, 212. For performing the slow-up or slow-down of the actuation speed of the cylinders for each axis at the time of the actuation start or stop based upon the foregoing ON or OFF signals, each actuation start input terminal of the servo-amplifiers is connected to an integration circuit, which comprises the capacitor C1 and the variable resistances R1, R2 effecting a predetermined time constant, through the switching transistor T1 and the inverter In1 as shown in FIG. 6. Each actuation stop input terminal is connected to the base of the switching transistor T3, which is connected in series to the coil CRF, —of each servo-valve through the inverter In 2. The operational amplifier OP amplifies the voltage out of the integration circuit and serves to control the electric current which is supplied to the coil of the servo-valve. The variable resistance R3 connected to the operational amplifier OP provides a negative feed back of the amplified voltage for adjusting the gain and serves to set the maximum speed of the actuator for each axis. The vaiable resistance R4 is provided for adjusting the output voltage when the voltage out of the integration circuit becomes zero, and is used for determination of the creep speed after the slow-down of the actuation velocity. Thus, the variable resistance R4 is adjusted beforehand so as to generate a predetermined voltage as the output of the operational amplifier OP even if the input thereof is zero.

Figure 8:
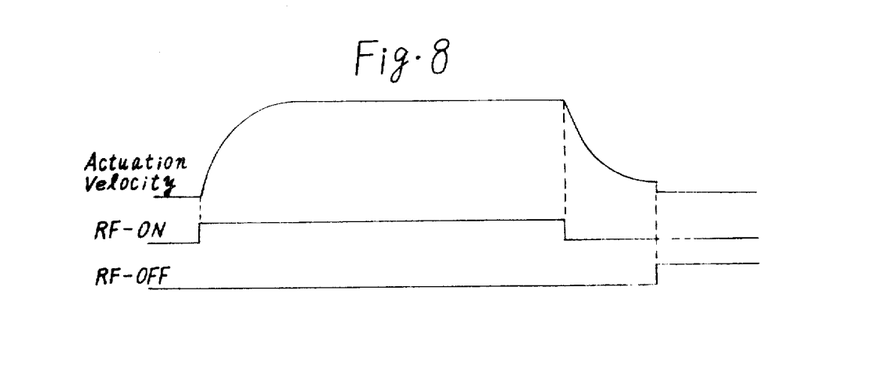
FIG. 8 shows a relationship between a velocity of a servo-actuator and input signals supplied to a servo-amplifier in accordance with the present invention.

Assuming that the flip-flop circuit for the R-axis in the register 206 is set under the condition of F>G and the flip-flop circuit for the R-axis in the register 207 is being reset under the dissatisfaction of the condition of X<Y, that is, under the condition of X ≧ Y, then the AND gate GF1 for the R-axis is enabled and a high level voltage is loaded into the actuation start input terminal RF-ON of the servo-amplifier SARF. This high level voltage signal is inverted by the inverter In1 and therefore, a low level voltage signal is supplied to the base of the switching transistor T1 so as to be made of the same non-conductive condition. A consequence thereof, the capacitor C1 is charged through the resistance R1 and the input voltage of the operational amplifier OP is, therefore, gradually increased and the current through the transistor T2 which is connected in serial to the coil CRF of the servo-amplifier SVR is gradually increased. It is to be noted that the switching transistor T3 is ready to pass the electric current since the low level voltage signal is supplied to the actuation stop input terminal RF-OFF and therefore, the high level voltage signal is given to the base of the transistor T3 by means of the inverter In2. Thus, the electric current controlled by the transistor T2 is increased and is passed through the coil CRF so that the control port in the servo-valve SVR for the advancing to the forward actuation of the hydraulic cylinder is gradually opened. Consequently, the slow-up control of the actuation velocity of the hydraulic cylinder can be performed as shown in FIG. 8. The present position, that is, the present value which is changed in response to the actuation of the hydraulic cylinder is detected by the encoder. When the difference X between the command value F and the present value G becomes smaller than the slow-down setting value Y, the flip-flop circuits for the R-axis in the register 207 is set and the AND gate GF1 is, therefore, disabled or shut. As a result thereof, a high level voltage is provided to the base of the switching transistor T1 so that the electric current can pass therethrough. Thus, the electrical charge on the capacitor C1 is discharged through the resistance R2 and the input of the operational amplifier OP is gradually decreased so that the electric current through the transistor T2 is decreased. In response thereto, the opening rate of the control port of ther servo-valve SVR is decreased and therefore, the slow-down control on the actuation velocity of the hydraulic cylinder can be performed. The minimum speed after the slow down control is maintained at the creep speed determined by the resistance R4 and thereafter, when the coincidence signal $F=G$ is generated, the flip-flop circuit for the R-axis in the register 212 is set and the equal signal REQ for the R-axis is generated, and in consequence, the AND gate connected to the actuation stop input terminal RF-OFF gnerates a high level voltage signal. Thus, the switching transistor T3 is brought into non-conductive condition so that the electric current through the coil CRF of the servo-valve SVR is cut off, and the actuation of the hydraulic cylinder is stopped.

In this way, each servo-amplifier and servo-valve are controlled in response to the ON or OFF signals, which means the Drive, SLOW DOWN and STOP, generated from the registers 206, 207, 212 and serve to control the slow-up, slow-down and stop of the actuation of the hydraulic cylinder for each axis.

Based upon the command values which were set in the register 200, the servo-valves 26, 28, 30, 32 and 34 are controlled for actuating the hydraulic cylinders for the respective axes so that the fingers 22 are positioned at the predetermined desired position. When the present values G for all axes became coincident with the command values F for all axes, the all axis coincidence signal AEQ is generated and is supplied to the auxiliary function generator 213. Based upon it, the auxiliary function operations, such as the opening and closing operations of the fingers etc., are sequencially performed. When all of the auxiliary functions have been completed, the auxiliary function completion signal FIN is generated from the generator and is supplied to a main control circuit.

In response to the given signal FIN, fresh data is read out from the following new addresses of the memory, and new point informations are set in the register 200 and the actuation controls for the respective hydraulic cylinders are performed in order. In this way, the industrial robot 10 as the controlled object can be controlled in accordance with the previously programmed commands. ll Obviously many modifications and variations of the present invention are possible in light of the above teachings. It is to be understood therefore that within the scope of the appended claims the invention may be practiced otherwise than as specifically described herein.

What is claimed as new and desired to be secured by letters patent of the United States is:

1. Control device for multi-axis servo-actuators serving to control a position and a posture of a controlled object having a plurality of degrees of freedom in a three-dimensional space, comprising:

command value register means for setting a plurality of command values for respective axes;

present position detecting means for detecting the present position of each of said servo-actuators and for generating present values for said respective axes in response to said present positions;

a first selector connected to said command value register and serving to sequentially select and output of said command values in accordance with scanning signals;

a second selector connected to said present position detecting means and serving to sequentially select and output one of said present values in accordance with said scanning signals;

scanning signal generating means for generating said scanning signals;

a first comparator connected to said first and second selectors and serving to sequentially compare said present value with said command value for each axis and for generating a first control signal and a second control signal, said first control signal representing an inequality between said command value and said present value, and said second signal indicating a coincidence between said command value and said present value;

a second comparator serving to generate a third signal when the difference between said command value and said present value becomes smaller than a predetermined setting value;

first register means serving to generate an actuation and direction indication signal for each axis in response to said first and third signals supplied from said first and second comparators in accordance with said scanning signals out of said scanning signal generating means;

second register means serving to memorize said coincidence signal for each exis in response to said second signal supplied from said first comparator in accordance with said scanning signals supplied thereto and to generate an actuation stop signal for each axis based upon said coincidence signal, said actuation and direction indicating signal and said actuation stop signal being switching or on-off signals.

a plurality of servo-amplifiers provided for said respective axes and connected to said first and second register means so as to be supplied with said actuation and direction signal and said actuation stop signal, and respectively generating a predetermined output in response to said actuation and direction signal and said actuation stop signal; and, a plurality of servo-valves connected to said servo-amplifiers and serving to control the actuations of said servo-actuators in accordance with said predetermined output out of said servo-amplifier for each axis.

2. A control device according to claim 1, further comprising a subtraction circuit connected to said first and second selectors for providing said difference between said present value and said command value.

3. A control device according to claim 1, further comprising setting switch means storing said predetermined setting value for each axis to be applied to said second comparator.

4. A control device according to claim 1, further comprising means for generating a signal indicating a completion of all axis movements based upon said coincidence signals for all axes out of said second register means, said signal serving to indicate a requirement for fresh control information.

5. A control device according to claim 1, wherein said present position detecting means is a plurality of encoders provided for detecting the respective axis movements of said controlled body.

6. A control device according to claim 1, wherein said first and second register means respectively comprise a plurality of flip-flop circuits corresponding to said respective axes for memorizing said actuation and direction indicating signal and said actuation stop signal for each axis.

7. A control device according to claim 1, wherein said servo-amplifier comprises an operational amplifier having an input terminal connected to a constant voltage source, and a switching means connected thereto for controlling the supply of constant voltage to said operational amplifier, said switching means being operated by said actuation and direction indicating signal.

8. A control device according to claim 7, wherein said servo-amplifier further comprises a capacitor between said constant voltage source and said operational amplifier for gradually increasing and decreasing said actuation velocity of said servo-actuator.

* * * * *